MAGNETIC DATA STORE

Original Filed Dec. 24, 1958

INVENTOR.
ROBERT L. GRAY, JR.
BY Henry W. Kaufmann
AGENT

United States Patent Office 3,264,621
Patented August 2, 1966

3,264,621
MAGNETIC DATA STORE

Robert L. Gray, Jr., Birmingham, Mich., assignor to Burroughs Corporation, Detroit, Mich., a corporation of Michigan Continuation of application Ser. No. 782,914, Dec. 24, 1958. This application Mar. 25, 1963, Ser. No. 269,833
12 Claims. (Cl. 340—174)

Figure 1:
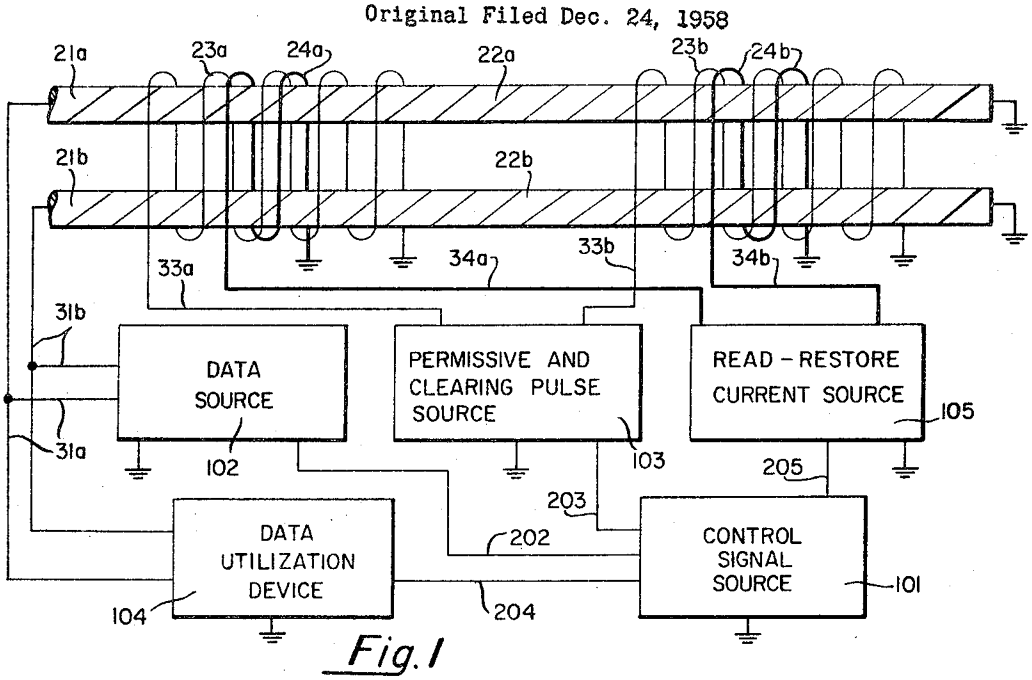

The present application is a continuation of Serial No. 782,914, filed December 24, 1958, and now abandoned.

It is well known in the art of electrical data processing and computation to store information in magnetic materials of high retentivity by coding such information in binary form and arbitrarily assigning to the two possible directions of retentivity of a magnetic element a correspondence with the two possible values of a binary element of information. It is almost universally desired that information so stored be recoverable in the form of an electrical signal. Two principal techniques have been found technically and economically feasible to do this. In one case (as in tape, drum and disk stores) the magnetic material is moved rapidly past a sensing or reading head in whose windings voltages are induced which are representative of the state of magnetization of the magnetic material. Such a method is not ordinarily destructive of the information thus stored, but it has the disadvantage of requiring rather high-speed motion within close mechanical tolerance, and a certain access time must ordinarily be allowed for the desired information to become accessible to the head. Fixed or mechanically static stores employing large numbers of magnetic elements are commonly used where it is not possible to predict which particular item of information will be required at a given time, and random access is therefore highly desirable. However, the common way of converting such stored magnetic data into an electrical signal is conventionally that of applying to the magnetic element a field which will drive the element to saturation in the direction of the field; if the element was remanent in the opposite direction, the large flux change involved in its reversal will induce a voltage in conductors coupled to the magnetic element. This mode of reading out the information thus stored always leaves the element magnetized in the direction of the reading field, and thus destroys the stored information. There are many operations where the same information is required again and again and, to employ a store with destructive read-out in such a connection, it is necessary to perform what is known as regeneration, which is quite simply the external storage and subsequent recording of the information just read out. This requires time and equipment, and is therefore not desirable; however, it is a tolerable evil in view of the great advantage of random access and high operating speed obtainable by the use of mechanically static stores. It is actually common practice to provide complete computing systems with various kinds of magnetic stores, which fact is perhaps the best possible evidence that no particular type of conventional data store is infinitely superior to any other.

Until recently, it has been conventional to employ separate pieces of magnetic material, usually closed cores, to store in static stores individual items of binary information, or bits. However, the use of extended pieces of magnetic material having a capacity for a number of bits in a single such piece is known (e.g., Bobeck, Bell System Technical Journal, November 1957, pp. 1319–1340). In general, the boundary lines between the different portions of such a piece of magnetic material which are employed to store different bits of information are determined by the magnetic fields which are externally applied to the magnetic material. It has been recognized that it is necessary to allow sufficient space between adjacent portions corresponding to different bits so that the magnetic fields applied to affect only one such portion will not affect an adjacent portion. The reading methods which have thus far actually been made known to the public all involve destruction of the stored information.

My invention teaches a use of a single piece of magnetic material to store multiple bits of information, with non-destructive readout, although the value of any stored bit may be changed at will. All the advantages of random access, compactness, high speed of operation, and other desirable features of mechanically static stores are retained.

Thus an object of my invention is to teach a method of non-destructive observation of stored data in a mechanically static magnetic information store.

Another object of my invention is to provide an inexpensive, compact data store of large capacity in which the reading operation is independent of the operation of writing.

Other objects and advantages of my invention will become apparent in the course of the following description and specification of my invention.

To facilitate the explanation of my invention, I provide drawings attached hereto, as follows:

FIGURE 1 represents a data storage device for storing four binary-valued bits of information, and reading the stored information non-destructively, in accordance with my invention.

Figure 2A:
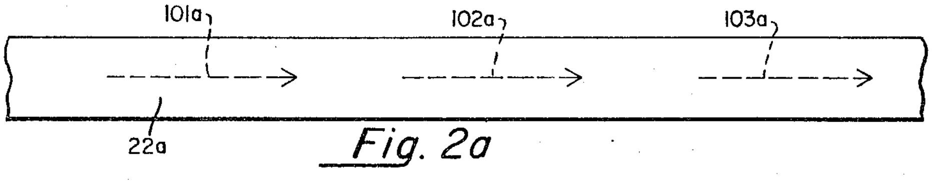
Figure 2B:
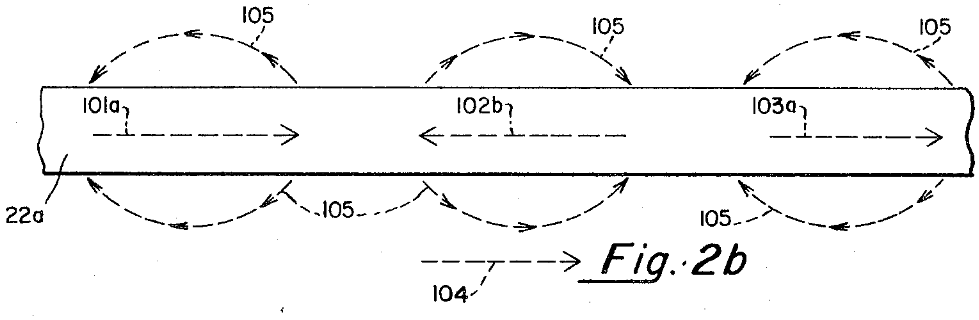
Figure 2C:
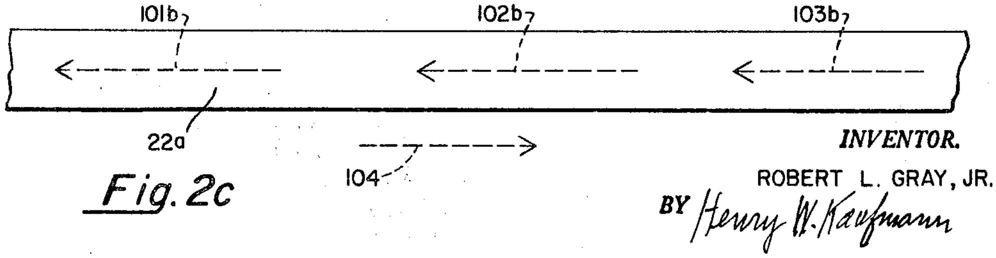

FIGURES 2*a*, 2*b* and 2*c* represent a development of a portion of the magnetic material represented in FIGURE 1, with an indication of applied magnetizing fields and resulting senses of magnetization, for the better explanation of the principles of operation of my invention.

In FIGURE 1, 21*a* and 21*b* are central conductors around which are wrapped, respectively, strips of magnetic material 22*a* and 22*b*, having a preferred direction of magnetization substantially along their length, and showing a substantially rectangular hysteresis loop or curve of magnetic flux density versus magnetizing field. Such material is known in the present art and may be, for example, unannealed 4–79 molybdenum permalloy (nominally 4% Mo, 79% Ni, 17% Fe), which has not been annealed after its last rolling. A suitable size of such material is a strip one eight-thousandth of an inch thick and seventeen one-thousandth inch wide. The direction of wrapping is such that the length of the strips 22*a* and 22*b* is helical about the axis of the respective central conductors 21*a* and 21*b*, and thus the direction of easy or preferred magnetization is also helical about such central axes. This form of construction facilitates the explanation of my invention; it is described in co-pending application, Serial No. 748,405, filed July 14, 1958, and now abandoned, entitled "Helical Wrap Memory," of John D. Blades, which is assigned to the assignee of this application. At two different longitudinal locations along the wrapped assemblies of 21*a* and 22*a* and of 21*b* and 22*b*, there are wound solenoids 23*a* and 23*b*. Also around the assemblies of conductor 21*a* and tape 22*a*, and of conductor 21*b* and tape 22*b*, and substantially intermediate the ends of the winding of solenoid 23*a*, there is wound solenoid 24*a*, which may be outside or inside of solenoid 23*a*, or interwound with it. It is basic to my invention that solenoid 23*a* shall produce a magnetizing field uniform in sense over a portion of tapes 22*a* and 22*b* greater than and including that part of tapes 22*a* and 22*b* over which solenoid 24*a* produces a considerable magnetizing field. In other words, solenoid 23*a* when carrying current produces a substantial magnetizing field over a portion of tapes 22*a* and 22*b*, and solenoid 24*a* when carrying current produces a substantial magnetizing field over only a part of such portion. The known art teaches a number of various forms and modes of winding and connection of turns which are all equivalent in producing the stated effect.

Referring now to FIGURES 2*a*, 2*b* and 2*c*, there appears a representation of that portion of tape 22*a* which lies in the effective field of solenoid 23*a*. This is not a true pictorial representation, but is a development of the tape 22*a*, presenting it as flat according to draughting conventions. This representation has the convenient property that the axis or direction of easy magnetization appears as a straight line, so that direction or sense of magnetization also appears as a direction along such line. FIGURE 2*a* represents the stated portion of tape 22*a* with all parts of that portion magnetized in the same direction, as indicated by the arrows 101*a*, 102*a*, and 103*a*. This would be the effect of applying by solenoid 23*a* a magnetizing field component directed to the right and exceeding the coercive force of the material of 22*a*. FIGURE 2*b* represents a situation identical with that of FIGURE 2*a* except that the direction of magnetization of the intermediate part of the represented portion of tape 22*a*, generally indicated by arrow 102*b*, is opposite in direction from that represented in FIGURE 2*a* by arrow 102*a*. This effect would be produced by the application by passage of current through solenoid 24*a* of a magnetizing field opposite in direction, or sense, to that applied by solenoid 23*a* to produce the situation represented in FIGURE 2*a*. In the situation represented in FIGURE 2*a* there is a substantially continuous magnetic flux along the entire length of the portion of 22*a*, existing primarily within the tape 22*a*, and with practically no magnetic flux leaving tape 22*a* at the boundaries between 101*a* and 102*a*, or between 102*a* and 103*a*. The situation represented in FIGURE 2*b*, on the other hand, requires the existence of magnetic poles at the boundaries between arrows 101*a* and 102*b*, and between arrows 102*b* and 103*a*. An alternate way of expressing this physical fact is to say that magnetic flux, represented by arrows 105, leaves the tape 22*a* at the boundary between arrows 101*a* and 102*b* and returns at the boundary between arrows 102*b* and 103*a*. This situation, by well known physical principles, leaves the central part of the portion of strip 22*a*, where arrow 102*b* is shown, subjected to a magnetizing field which tends, but may be insufficient in amplitude, to reverse the magnetization of the central part to that sense or direction represented by arrow 102*a*. If there be applied by passage of current through solenoid 24*a* a magnetizing field component in the direction represented by arrow 104, a certain amplitude of that field component in the presence of the assisting fields represented by arrows 101*a* and 103*a*, will suffice to reverse the magnetization of the central part, restoring the condition represented by FIGURE 2*a*. If, on the other hand, the condition of the represented portion of tape 22*a* is as indicated in FIGURE 2*c*, with all parts of the tape portion magnetized in the same sense, indicated by arrows 101*b*, 102*b*, and 103*b*, the same amplitude of magnetizing field component represented by arrow 104 will not suffice to reverse the magnetization of the central part of the portion of tape 22*a*, because the fields represented by arrows 101*b* and 103*b* will oppose such reversal. It is true that the situations represented by FIGURES 2*a* and 2*c*, in which all parts of the portion of tape 22*a* are magnetized in the same direction, will result in the existence of some magnetic flux from the extreme ends of the tape portion returning through the space external to the tape 22*a*; but, because the extreme ends of the represented portion of tape 22*a* are relatively distant from the ends of the central part where arrow 102 is drawn, the magnetizing field so produced at the central part will be negligibly weak. It is a well known fact that the demagnetizing effect of the poles of a bar magnet upon the center of such a magnet becomes less and less as the bar magnet is made longer and longer; and a parallel situation exists here.

Given the preceding explanation of the physical phenomena under consideration, the mode of operation of my invention may be somewhat more specifically described. The entire portion of tape 22*a* represented in FIGURES 2*a*, 2*b*, and 2*c* will be used to store a given item of binary information, by appropriately magnetizing such portion by passing appropriate current through solenoid 23*a*. Employing, for simplicity, the terms "one" and "zero" to denote the two possible values of an element of information, the situation represented by FIGURE 2*a* will be described as the "one" state of the tape portion, and that represented by FIGURE 2*c* will be described as the "zero" state of the tape portion. These both represent states corresponding to recorded information. To determine what information is thus recorded, a reading field component in the sense of arrow 102*b* (FIGURES 2*b*, 2*c*) is applied by passage of current through solenoid 24*a*. The magnitude of this field component is sufficient so that, if the tape portion was in the "one" condition (FIGURE 2*a*), the central part of the tape portion will be reversed in magnetization, passing to the state represented in FIGURE 2*b*. A substantial change in the flux through the central part of the tape portion will occur, inducing a voltage in any conductor linked with the central part. If, on the other hand, the tape portion was in the "zero" condition, the application of the reading field will produce only a negligible effect on the magnetization of the tape portion, simply driving the central part through the very slight flux change from remanence to saturation, and inducing only a very small voltage in any conductors linked therewith. Thus the condition of the tape portion, if in the "zero" state before reading, will be essentially unchanged after reading; FIGURE 2*c* represents either of these states.

The reading operation described has not destroyed the stored information, because the state of the tape portion, after reading, is different depending upon whether a "one" or a "zero" was stored in it before reading. However, for a stored "one" the reading operation does, at least temporarily, alter the magnetic state of the tape portion, as represented by the differences between FIGURES 2*a* and 2*b*. If the coercive force of the tape 22*a* is sufficiently low, the restoring magnetizing field provided by the extreme parts of the tape portion, which remain in the "one" condition, may suffice to restore the central part of the tape portion to its original or "one" state of magnetization immediately upon the cessation of the reading field component. However, it is possible to practice my invention even with materials having coercive forces so high that this spontaneous restoration does not occur. A uniform restoration or regeneration procedure, which may be applied without any knowledge of the information stored, will restore the tape to its pre-reading condition. This restoration procedure consists simply in the application, by passage of current through solenoid 24*a*, of a field component opposite in direction or sense to the reading field component, and smaller in magnitude, so that, as described in the preceding discussion of FIGURES 2*b* and 2*c*, it will suffice to restore the tape portion from the condition represented by FIGURE 2*b* to the condition represented by FIGURE 2*a*, but will not alter the tape portion from the condition represented by FIGURE 2*c*. It is apparent that, logically, this restoration operation may be performed at any time between successive reading operations. However, if extreme density of recorded information is to be achieved, it is desirable that, to avoid accidental and undesired effects of operations upon adjacent tape portions, all parts of any given tape portion be left magnetized in the same direction, so that there will not be a demagnetizing effect of opposing magnetization of different parts which may render the stored signal less stable. Indeed, there is no actual necessity for regarding the restoration field as anything but a specified part of the entire reading field which, from this point of view, is bipolar. Alternatively, there may be provided a restoring field component which continues during the operation of the device, but is overcome by the reading field component during the reading operation. Such a continuing field may be provided either by passing a continuous current of controlled magnitude through an additional solenoid wound together with the reading solenoid 24*a*, or by providing a continuous current which flows through solenoid 24*a* but is overcome by the application of the reading pulse current through solenoid 24*a*. From any point of view, the reading operation as described is non-destructive, in that there is no necessity for performing after reading an operation dependent upon the particular values of information read out.

Considering FIGURE 1 once more, the following dimensions are given as preferred for operation at moderately high speeds, of the order of one and one-half microseconds for the reading and restoring operation. It will be recognized that operation at lower speeds will render the use of somewhat increased dimensions permissible; while, for higher speed operation, dimensions proportionately reduced so far as is feasible will be preferable. The central conductors 21*a*, 21*b* are of copper wire #35 A.W.G., corresponding to a nominal diameter of 5.614 mils, or thousandths of an inch. The tapes 22*a*, 22*b* are one eighth of a mil thick and 17 mils wide and are wound with no overlap or with overlap up to two-thirds of the tape width. Solenoids 23*a* and 23*b* are wound of forty turns of wire #29 A.W.G., corresponding to a nominal diameter of 11.26 mils, to a total winding length of about 0.5 inch. Solenoids 24*a* and 24*b* are of ten turns of wire #36 A.W.G., corresponding to a nominal diameter of 5.0 mils, to a total winding length of approximately 1/32 inch; these solenoids are wound under solenoids 23*a* and 23*b* respectively, and substantially centered under their respective solenoids. The wires are insulated with a conventional insulating enamel, such as the product known commercially as "Formvar." Spacing between adjacent ends of solenoids 23*a* and 23*b* is one tenth of an inch.

In order to illustrate the principles of my invention in an embodiment of moderate complexity, such as may be desirable in modern computing and data-processing usage, I have represented in FIGURE 1 an arrangement of the various solenoids in such fashion as to permit the use of certain means for selection of specific tape portions for recording of data by the combined applications of various magnetizing field components. As is described in more detail in the referenced application of Blades, it is possible to produce a resultant magnetizing field substantially along the helically disposed direction of easy magnetization of the tape 22*a* by producing a magnetizing field component by passage of current through a solenoid, such as 23*a*, which component will be substantially along the central axis of conductor 21*a* or 21*b*, and by producing simultaneously a magnetizing field component circular around conductor 21*a* by passing current through conductor 21*a*. Thus, in FIGURE 1, a conventional current flowing from ground through solenoid 23*a* and out through its ungrounded end will produce at the left-hand portions of tapes 22*a* and 22*b* a magnetizing field directed toward the right of the figure. If the current through the solenoid is made of proper magnitude, this magnetizing field component will be insufficient by itself to magnetize tape 22*a* or tape 22*b*. If, however, a conventional current is fed from ground through conductor 21*a* and out through the ungrounded left end of conductor 21*a*, this current will produce a magnetizing field component circular around conductor 21*a*. By properly controlling the magnitude of this current through the conductor 21*a*, the magnetizing field component it produces may be made such that it will combine with the magnetizing field component from solenoid 23*a* to magnetize from the "zero" to the "one" sense or direction that portion of tape 22*a* lying substantially within solenoid 23*a*. The magnetizing field component produced by solenoid 23*a* will not suffice alone to magnetize any portion of tape 22*b*; and the magnetizing field component produced by the current through conductor 21*a* will not suffice alone to magnetize the portion of tape 22*a* lying outside of solenoid 23*a*, particularly that portion of tape 22*a* lying substantially within solenoid 23*b*. Thus it is possible to apply permissive current through solenoid 23*a* to render it possible for currents through conductors 21*a* and 21*b* to magnetize to the "one" state those portions of tapes 22*a* and 22*b*, respectively, which lie within the effective field produced by solenoid 23*a*. Individual "bit" or binary "one" digit signals may be applied to conductors 21*a* and 21*b*; and, as the preceding discussion indicates, the presence or absence of permissive currents in solenoids 23*a* or 23*b* will determine the recording or non-recording, respectively, of "ones" in the portions of tapes 22*a* and 22*b* affected by the fields of the respective solenoids. The assembly represented by FIGURE 1 may be regarded as consisting of two "words" (in conventional computer terminology) of two binary digits each. It is now apparent that conventional reading current passed through solenoid 24*a* to ground will read out the data stored in the left-hand portions of tapes 22*a* and 22*b*, the signals appearing inter alia as induced voltages at the terminals of conductors 21*a* and 21*b*; and that reading current applied to solenoid 24*b* will read out the data stored in the right-hand portions of tapes 22*a* and 22*b*, the signals appearing again as induced voltages at the terminals of conductors 21*a* and 21*b*. Likewise, it is apparent that a current in solenoid 23*a* opposite in direction to and sufficiently greater in magnitude than the permissive current will reverse to the "zero" state the left-hand portions of tapes 22*a* and 22*b*, FIGURE 1, thus performing the function known in computer terminology as "clearing" the word stored in those tape portions.

Modern data-processing equipment is capable of extremely high operating speeds, at a considerable cost in equipment. Frequently economy requires that given pieces of apparatus be caused to perform a variety of different functions at different times, these functions either being so chosen that the same apparatus performs functions which logically cannot be required simultaneously, or controls being provided so that the performance of one function is held in abeyance until a conflicting function has been completed. Since such division of functions is very much an ad hoc property of a particular computer design, and since my invention in this and other embodiments is applicable to a wide variety of equipment requiring data storage, I have represented by rectangular blocks equipment whose functional capabilities will be defined and described, and whose construction is taught abundantly by the known art; but it must be understood that in an actual computer the elements employed to perform such functions might be employed to perform other functions as well, and that the apparatus performing the functions assigned to a particular rectangular block might not appear in an actual computer or data-processing device as a single entity, but might be dispersed throughout the machine. This is as though, in describing a novel alternator construction, I should represent a separately driven exciter, although actual commercial construction would probably incorporate the exciter shaft as part of the shaft of the alternator, both machines being driven by the same prime mover. The teaching of my invention is clarified by the use of such functional blocks.

Control signal source 101 is a source of control signals which are produced at proper times, in accordance with the logical needs of the computing or data-processing system, to effect the results to be described hereinafter. Data source 102 is a source of binary data to be recorded; in compliance with signals received over line 202 from control signal source 101, it feeds appropriate electrical signals to conductor 31*a* and conductor 31*b*;

it has the characteristic that when not so functioning it presents a relatively high shunting impedance between conductors 31*a* and ground, and 31*b* and ground, in order that it will not shunt out any large fraction of the currents flowing as a result of voltages induced in conductors 21*a* and 21*b* by the reading process. Permissive and clearing pulse source 103, in response to control signals received via line 203 from control signal source 101, will provide permissive current of a given polarity and magnitude or clearing current of opposite polarity and greater magnitude to either solenoid 23*a* or 23*b* via conductors 33*a* or 33*b*, respectively, according to the particular control signal received; it is apparent that, since there are at least four possible functions involved, these control signals may be coded pulses transmitted over a single line, or line 203 may actually be replaced by several separate conductors to carry separately a signal to perform a given function, or any other combination of lines and signals known to the art may be employed. Data utilization device 104 represents whatever physical apparatus the construction and logic of the particular system may provide to receive the stored data when it is read out from the store in the form of electrical signals. It is connected with control signal source 101 by line 204 in order that it may be made to function appropriately when control signal source 101, by activating other associated apparatus, causes the reading of stored data, and in order that it may be rendered inactive or insensitive to the relatively larger voltages applied to conductors 31*a* and 31*b* during the data writing operation and to any voltages generated during a clearing operation. Read-restore current source 105, upon receipt of the appropriate control signals via line 205 from control signal source 101, applies to either solenoid 24*a* via conductor 34*a* or to solenoid 24*b* via conductor 34*b* a reading current pulse of given polarity and magnitude, and (either immediately after the cessation of the reading current pulse or, if desired, at some time thereafter) a restoring current pulse of opposite polarity from the reading current pulse, and of smaller magnitude. As is evident from the discussion of FIGURE 2, the reading pulse must be of sufficient magnitude to reverse the sense of magnetization of the central part of a given tape portion despite the opposing magnetizing field provided by the end parts of the tape portion; but the restoring pulse must be of such lesser magnitude that it will restore the original sense of magnetization of the central part of the given tape portion if, but only if, it is assisted by the magnetizing field provided by the end parts of the tape portion.

A typical operating cycle of the device represented in FIGURE 1 is the following. Control signal source 101 via line 203 causes permissive and clearing pulse source 103 to send a clearing pulse of conventional current via conductor 33*a* through solenoid 23*a* to ground, whence it returns to its source 103. Concurrently or sequentially permissive and clearing pulse source 103 sends a clearing pulse of conventional current via conductor 33*b* through solenoid 23*b* to ground, whence it returns to its source 103. Each of these clearing current pulses, in flowing through its appropriate solenoid, produces a magnetizing field directed to the left of the figure, and of such magnitude that its component along the direction of easy magnetization of the portions of tapes 22*a* and 22*b* lying within the solenoid exceeds the coercive force of the tapes 22*a* and 22*b*. This will cause the four tape portions lying within solenoids 23*a* and 23*b* to be magnetized in a direction having a component to the left of FIGURE 1. For purposes of description, this direction is arbitrarily assigned a "zero" significance, consistent with previous description. Thus the entire magnetic store contains "zeros" or is said to be "cleared." At some later time, control signal source 101 sends a signal via line 203 to permissive and clearing pulse source 103 which causes it to draw from ground through solenoid 23*a* via conductor 33*a* a permissive pulse of conventional current of such smaller magnitude than the clearing pulse that the resultant magnetizing field produced by the permissive pulse around those portions of tapes 22*a* and 22*b* lying substantially within solenoid 23*a* will have a component along the direction of easy magnetization of those tape portions which is less than the coercive force of the tape. Approximately simultaneously control signal source 101 sends a signal via line 202 to data source 102 which causes it to draw from ground through conductors 21*a* and 21*b* via conductors 31*a* and 31*b* writing pulses of conventional current corresponding to the "ones" bits of data which are to be recorded or stored at this time. Let it be assumed that the data to be stored are a "one" in the left-hand portion of tape 22*a* and a "zero" in the left-hand portion of tape 22*b*. Then, since the requisite "zero" is already recorded in the proper portion of tape 22*b*, no current need actually be drawn through conductor 21*b*; since the permissive current in solenoid 23*a* has been specifically made less than sufficient to alter unassisted the magnetization of the tape portions within the solenoids, the "zero" state of tape 22*b* will continue.

An alternative to applying no current to conductor 21*b*, as above described, is to modify the characteristics of data source 102 so that it applies "one" signals by drawing current from ground through the appropriate conductor as above described, but it also feeds current to ground through the conductors where "zero" is to be recorded to insure that there will be a slight magnetizing field tending to preserve the "zero" state from destruction wherever it already exists in the tape 22*b*. This alternative has the advantage that it is a positively applicable measure which reduces somewhat the stringency with which the permissive pulse must be held within its maximum value; i.e., it reduces some of the design tolerances of the overall system. The current which is employed to insure the preservation of the "zero" state must itself, of course, be maintained sufficiently small so that there is no danger that it will return to the "zero" state any portions of tape which already (and properly) are in the "one" state of magnetization. In actual practice, the choice of this alternative method will depend upon the relative cost and ease of controlling tolerances, and other various factors. As is indicated in a number of the appended claims, it is primarily the application of the proper magnitudes of magnetizing fields to the specified parts of the tape upon which the operation of my invention is based, and there are many ways taught by the art existing prior to my invention for accomplishing this. However, consistently with the requirement to store a "one" in the left-hand portion of tape 22*a*, there will be drawn from ground through conductor 21*a* via conductor 31*a* to data source 102, a writing current pulse of such magnitude that it will produce around conductor 21*a* a circular magnetizing field which will combine with the field of solenoid 23*a* to produce a resultant having a component along the direction of easy magnetization of the left-hand portion of tape 22*a* greater than the coercive force of the tape and in such direction as to magnetize that portion of tape 22*a* in the "one" direction. The magnitude of the writing current drawn through conductor 21*a* is limited so that the magnetizing field produced by it at other portions of the tape 22*a*, particularly that portion lying within solenoid 23*b*, will have a component along the direction of easy magnetization of tape 22*a* of magnitude less than the coercive force of the tape; thus the portion of tape 22*a* lying within solenoid 23*b* will remain in its cleared or "zero" state. Thus there is selectively recorded in the left-hand portions of the tapes 22*a* and 22*b* the "word" composed of the binary digits, 1, 0. It is now obvious what modifications of the foregoing described procedure will cause recording of signals in the other portions of the tapes, and also that the number of solenoids along a given tape and conductor assembly may be vastly increased to provide greater data storage capacity, and that the number of tape and conductor assemblies within the solenoids may be increased to permit the simultaneous storage or reading of a larger number of binary digits; and the known art (to which partial general reference is made at the end of this specification) teaches many other modifications of the foregoing.

Given now that the desired data have been recorded in the data store represented in FIGURE 1, let it be assumed that it is desired to read out the data stored in the left-hand portions of tapes 22*a* and 22*b*. Control signal source 101 via line 204 sends to data utilization device 104 a signal which causes data utilization device 104 to become responsive to voltages appearing on conductors 31*a* and 31*b*. Control signal source 101 also sends via line 205 to read-restore current source 105 a control signal which causes it to send through conductor 34*a* and solenoid 24*a* to ground, whence it returns to its source, a pulse of conventional current of sufficient amplitude to produce at the central parts of the left-hand portions of tapes 22*a* and 22*b* a magnetizing field, oriented toward the left of the figure, whose component along the direction of easy magnetization of the central parts of the two tape portions will exceed the coercive force of the tape material. Then, assuming that tape 22*a* within solenoid 23*a* is remanent in the "one" sense or direction and that tape 22*b* within solenoid 23*a* is remanent in the "zero" sense or direction, the central part of that portion of tape 22*a* will be reversed in direction of magnetization, passing from remanent flux density in the "one" direction (which is very nearly as great as saturation flux density for materials having a substantially rectangular hysteresis loop) to saturation flux density in the "zero" direction. Such flux change will induce voltages in solenoids 23*a* and 24*a*, and in conductor 21*a*. The voltage induced in conductor 21*a* will appear on conductor 31*a*, and will be detected and accepted as an indication of a stored "one" by data utilization device 104. The central part of the portion of tape 22*b* within solenoid 23*a* will be subjected to the same magnetizing field as the central part of the corresponding portion of tape 22*a*; but since a "zero" sense or direction of remanent magnetization already exists in that portion of tape 22*b*, the only effect of this applied reading magnetizing field will be to produce the slight flux change corresponding to a transition from remanence to saturation, which will produce only a very slight disturbance potential on conductors 21*b* and 31*b*, and which will have no effect upon data utilization device 104, which will therefore operate on the basis that failure to receive at this time a voltage on conductor 31*b* corresponds logically to receipt of a "zero" signal. Thus the data digits 1, 0, will have been read and utilized.

The tape portion having a "zero" sense of magnetization will be unchanged by the reading operation, but that tape portion whose extremes are in a "one" sense of magnetization will have a central part in a "zero" sense (cf. FIG. 2*b*), if the field from the extreme parts is not sufficient by itself to restore the central part to the "one" sense at the cessation of the reading field. For this reason, at some time before the next reading operation (and preferably immediately after the cessation of the reading pulse) the read-restore current source 105 must draw from ground through solenoid 24*a* and conductor 34*a* a restoring pulse of conventional current of such magnitude less than the magnitude of the reading pulse that the field produced by its passage through solenoid 24*a* will suffice, with the fields from the extreme parts of the left-hand portion of tape 22*a*, to restore the central part of that tape portion to a "one" sense of magnetization (cf. FIG. 2*a*); but the restoring field thus produced will be insufficient, against the opposing fields of the extreme parts of the left-hand portion of tape 22*b*, to reverse the magnetization of the central part of that tape portion to the "one" sense (cf. FIG. 2*c*). Thus the tape portions containing a magnetically stored "one" may be restored to a complete "one" sense of magnetization without altering the "zero" sense of tape portions containing a magnetically stored "zero."

Thus there have been described the operations of clearing, writing or storing data in chosen parts of the store, reading from selected parts of the store, and restoring, which are all the functions necessary to be performed in the use of the store. Particular attention is invited to the novel fact that the reading and restoration operation may be repeated an unlimited number of times without the necessity of reference to any external store or register to permit the regeneration of data destroyed by the reading process; the reading operation here taught leaves magnetically stored in a part of the tape a record of what the stored data was before the reading operation; and the restoration operation is performed, not to replace data which has been destroyed and lost from the store, but to make it possible to read the information once more.

Since the physical operation of this invention depends more basically upon magnetizing fields (the term "magnetizing" being preferred for the quantity symbolized as "H" to distinguish it from the quantity symbolized as "B" which is sometimes called the magnetic field in a ferromagnetic material) than upon the particular means used to produce those magnetizing fields, it is apparent that ordinary skill in the art will suggest a large number of alternate ways of practicing the principles herein taught. Thus, in the writing operation described, it would be possible to apply to solenoid 23*a* a current sufficiently greater than the permissive current here specified, to magnetize all tape portions within the solenoid in the "one" sense, and to achieve selective writing by sending, from data source 102 via conductor 31*b* through conductor 21*b* to ground a pulse of conventional current of such magnitude that the circular magnetizing field which it will produce around conductor 21*b* will inhibit the magnetization in the "one" sense of the portion of tape 22*b* lying within solenoid 23*a*, but will be insufficient to alter the magnetization of portions of tape 22*b* lying outside the solenoid 23*a*. Similarly, it is possible to provide an additional solenoid whose magnetizing field will extend the entire active length of the tape and conductor assemblies, and to pass through such a solenoid a continuous current of such magnitude that it will provide the requisite restoring field at all central parts of all tape portions; or a similar effect may be produced by passing a continuous current of appropriate direction and magnitude through the solenoids 24*a* and 24*b* at all times except when the reading pulse is applied. Many obviously equivalent permutations are available to apply my invention to particular situations where its advantages are best enjoyed by some embodiment other than the one here represented.

As a practical point, the use of magnetic materials of sufficiently low coercive force has been found to permit dispensing entirely with any other restoring field except that produced on the central part of a tape portion by the extreme portions; such material may be used in the configuration of FIGURE 1 with the simple alteration that read-restore current source 105 may logically be changed to read-current source 105, and will provide only read pulses as described, but no restoring current. The non-linearity of the magnetic characteristics of the materials involved and the somewhat complex geometry render it extremely difficult to calculate mathematically the minimum ratio of total bit portion length to central part length which will produce this self-restoration for material of given maximum remanent flux density and coercive force. However, it is a general principle that, for a given geometry, that ratio will decrease as the ratio of maximum remanent flux density to coercive force is increased. This increase, of course, must be achieved either by the substitution of a different material, or by the alteration of the properties of the material by some physical treatment, since it is a physical characteristic of the material. Self-restoration has been found to occur experimentally in the following circumstances:

Referring to FIGURE 1 for reference to particular elements, conductor 21*a* was a tungsten wire 0.006 inch (six mils) in nominal diameter, plated to a nominal diameter of 0.00625 (six and one-fourth mils) with iron-nickel alloy having a preferred direction of magnetization substantially helical about the longitudinal axis of the wire 21*a*. This plating was the equivalent of the ferromagnetic material 22*a*. The angle between the preferred direction of the ferromagnetic material and the central or longitudinal axis of the wire 21*a* was nominally between 76.2 and 79.8 degrees, this range being calculated from the direction of the field existing during the formation of the ferromagnetic material. Coil 24*a* consisted of 10 turns of insulated wire #36 A.W.G. (nominal diameter five mils) one thirty-second of an inch long. The length of solenoid 23*a* was one inch; the spacing between adjacent ends of solenoids 23*a* and 23*b* was two-tenths inch. The coercive force of the magnetic material was measured as 6.34 oersteds. Under these conditions, it was found that the application of 0.400 ampere to coil 24*a* caused the central portion of the magnetic material on conductor 21*a*, i.e., that part lying substantially within coil 24*a*, to be switched in about 0.5 microseconds, giving an output of 30 millivolts across the ends of conductor 21*a*; and it was also found that this operation could be repeated an indefinite number of times without any intermediate restoration operation. Such a test is typical of the only feasible means of establishing self-restoration, since the switching or flux change can be detected only by observation of induced voltages.

While the combination of magnetic tape and conductor in accordance with the teaching of Blades, hereinbefore referenced, is convenient for teaching my invention, in that it permits the clarifying developments of FIGURES 2*a*, 2*b*, and 2*c*, equivalents in the functioning of my invention are the magnetic conductor having a helical direction of easy magnetization produced by mechanical twisting, as taught by Bobeck of reference, and indeed any means providing one or more conductors through which current may be passed to provide a magnetizing field component parallel to the direction of easy magnetization of a ferromagnetic element which is of such extent that reading out may be accomplished by observing voltages induced by the reversal of flux in a part only of such element, the remaining parts of such element retaining their informative sense of magnetization sufficiently to insure that the reversed part may be restored to a like sense of magnetization. Such element may be a portion of a larger piece of ferromagnetic material. Thus, a central conductor of non-magnetic material plated or otherwise coated with a ferromagnetic material having a substantially rectangular hysteresis loop and having a direction of easy magnetization substantially helical about the axis of such a central conductor can be used directly to replace the assembly of conductor 21*a* and tape 22*a* represented in FIGURE 1.

The magnetizing fields produced by solenoids and by currents through straight conductors are subject to fairly exact calculation by well known formulas, and their resultants may be found by simple vectorial addition. With the dimensions given as typical, currents of the order of a few tenths of an ampere suffice to provide magnetizing fields of the order of magnitude of the usual coercive force of the 4–79 molybdenum permalloy tape; since the particular coercive force of ferromagnetic material is subject to some variations as a result of processing variations, the particular values of current employed, and the permissible tolerances in such values must be calculated for the particular limits of coercive force to be employed. As indicated in Bobeck of reference, the helical disposition of the magnetic flux around the central conductor produces multiple interlinkage between the flux in the tape and the central conductor, so that the voltages of the signals read out are of the order of tens or even hundreds of millivolts, which may be amplified as desired by known means without the noise and other difficulties which attend the amplification of signals of much lower amplitude.

General references pertaining to the computer and data-processing art which may be useful in considering some of the applications of my invention are the following: publications of the Institute of Radio Engineers, 1 East 79 Street, New York City, N.Y., especially the publications of the Professional Group on Electronic Computers; publications of the American Institute of Electrical Engineers, 33 West 39 Street, New York City, N.Y., especially "Communication and Electronics"; publications of the Association for Computing Machinery, New York City, N.Y., and a general reference on the generation of pulses of controlled shape and amplitude, "Waveforms," volume 19 of the M.I.T. Radiation Laboratory Series, published by the McGraw-Hill Book Company, of New York, Toronto, and London.

What is claimed is:

1. A magnetic data store comprising a piece of magnetic material having a substantially rectangular hysteresis characteristic; means for magnetizing a portion of said magnetic material in a first direction corresponding to a first value of data to be stored and for magnetizing said portion of said material in a second direction opposite to said first direction to correspond to a second value of data to be stored; means for magnetizing a central part only of said portion of said magnetic material in said first direction; electrical means for detecting the flux change accompanying the said magnetizing of said central part of said portion of said magnetic material in said first direction; means for applying to said central part of said portion of said magnetic material a magnetizing field having a component in said second direction of magnitude sufficient to magnetize said central part of said portion of said magnetic material in said second direction if the extreme or non-central parts of said portion of said magnetic material are magnetized in said second direction, but not sufficient to magnetize said central part of said portion of said magnetic material in said second direction if the extreme or non-central parts of said portion of said magnetic material are magnetized in said first direction.

2. A magnetic data store comprising magnetic material having a preferred direction of magnetization along which said magnetic material exhibits a substantially rectangular hysteresis loop, recording means for magnetizing individual portions of said magnetic material in a first sense along said preferred direction to represent a first value of information and in a second sense to represent a second value of information, sampling means for magnetizing a median part only of a said individual portion in said first sense, detecting means for detecting the magnitude of the change of magnetization produced by operation of said sampling means, restoring means for applying to said median part of said individual portion a magnetizing field in said second sense and of intensity sufficient to magnetize said median part of said individual portion in said second sense if, and only if, the non-median parts of said individual portion are magnetized in said second sense.

3. A magnetic data store comprising a central conductor surrounded by magnetic material having a direction of easy magnetization substantially helical around said central conductor and exhibiting a substantially rectangular hysteresis characteristic, first solenoids of predetermined length wound externally around said central conductor and said magnetic material at selected locations along the length of said central conductor, second solenoids of considerably shorter length than said first solenoids, each of said second solenoids being wound around the said central conductor and said magnetic material in a medial position with respect to the axial length of a said first solenoid.

4. A magnetic data store as claimed in claim 3, further characterized by the fact that the second solenoids claimed therein have a length not more than one fourth of the length of the first solenoids claimed therein.

5. In a magnetic data store in which one of two values of information is stored by magnetizing a volume of magnetic material having a substantially rectangular magnetization characteristic in one of two possible senses of remanent magnetization along a preferred direction of magnetization; means for magnetizing a part only of said volume of said magnetic material in a first said sense, means for applying in a second said sense opposite to said first sense a magnetizing field component sufficient with the assistance of the magnetizing field produced by said volume exclusive of said part to magnetize said part in said second sense, but insufficient in magnitude to magnetize said part in said second sense when opposed by said magnetizing field of said volume exclusive of said part.

6. A magnetic data store comprising a homogeneous magnetic element of substantially uniform cross-sectional area, said magnetic element having a substantially rectangular hysteresis characteristic along a preferred direction of magnetization which is helical about said element, first means for magnetizing at least a portion of said magnetic element in a first sense of remanent magnetization to store a first value of information and in a second sense of remanent magnetization to store a second value of information, second means to apply to a part only of said portion of said magnetic element a magnetizing field sufficient to magnetize said part in said first sense, the length of said part being a sufficiently small fraction of the length of said portion that the magnetizing field produced by the remainder of the said portion when the sense of magnetization of said remainder is opposite to the sense of magnetization of said part will exceed at said part the coercive force of said part.

7. A magnetic data store comprising a magnetic element having a direction of preferred magnetization substantially helical along which said magnetic element exhibits a substantially rectangular hysteresis characteristic, a first solenoid external to said magnetic element having a central axis substantially parallel to the central helical axis of said magnetic element, and extending along at least a portion of the length of said magnetic element; a second solenoid of considerably shorter length than said first solenoid and being positioned external to said magnetic element, having a central axis substantially parallel to the said central helical axis of said magnetic element, and extending along only a median part of said portion of the axial length of said magnetic element.

8. A magnetic data store comprising a piece of magnetic material having a substantially rectangular hysteresis characteristic; means for magnetizing various portions of said magnetic material in a first direction corresponding to a first value of various items of data to be stored, each said item corresponding to a said portion, and for magnetizing said various portions of said material in a second direction opposite to said first direction to correspond to a second value of said various items of data to be stored; means for magnetizing a central part only of selected said various portions of said magnetic material in said first direction; electrical means for detecting the flux changes accompanying the said magnetizing of said central parts of said selected various portions of said magnetic material in said first direction; means for applying to said central part of each said selected portion of said magnetic material a magnetizing field having a component in said second direction of magnitude sufficient to magnetize said central part of said selected portion of said magnetic material in said second direction if the extreme or non-central parts of said selected portion of said magnetic material are magnetized in said second direction, but not sufficient to magnetize said central part of said selected portion of said magnetic material in said second direction if the extreme or non-central parts of said selected portion of said magnetic material are magnetized in said first direction.

9. A magnetic data store comprising magnetic material having a substantially rectangular hysteresis characteristic along a preferred direction of magnetization which is substantially helical about the material, a first winding positioned externally around said magnetic material along at least a portion of the length thereof, recording means including said first winding for magnetizing the said portion of magnetic material in a first sense along said preferred direction to represent a first value of information and in a second sense to represent a second value of information, a second winding positioned externally along only a median part of the said portion of magnetic material encompassed by said first winding, sampling means including said second winding for magnetizing in said first sense only said median part of the said portion of magnetic material, means for detecting the magnitude of change of magnetization produced by operation of said sampling means, restoring means including said second winding for applying only to said median part of said portion of magnetic material a magnetizing field in said second sense and of sufficient intensity to magnetize said median part in said second sense if, and only if, the non-median parts of the said portion of magnetic material are magnetized in said second sense.

10. A magnetic data store comprising an electrical conductor covered with magnetic material capable of attaining opposed states of residual flux density in representing binary logical information, said magnetic material having a preferred direction of magnetization substantially helical about said conductor, a first winding encompassing at least a portion of the magnetic material covering the length of said conductor, recording means including said first winding for magnetizing the said portion of magnetic material in a first sense along said preferred direction to represent a first value of information, and in a second sense to represent a second value of information, a second winding encompassing only the median part of the said portion of magnetic material encompassed by said first winding, sampling means including said second winding for magnetizing in said first sense said median part only of the said portion of magnetic material, the change in magnetization produced by the operation of said sampling means inducing a voltage signal in said electrical conductor, restoring means including said second winding for applying to said median part only of said portion of magnetic material a magnetizing field in said second sense and of sufficient intensity to magnetize said median part in said second sense if, and only if, the non-median parts of the said portion of magnetic material are magnetized in said second sense.

11. A magnetic data store comprising an electrical conductor having wrapped therearound a strip of magnetic material capable of attaining opposed states of residual flux density in representing binary logical information, said magnetic material having a preferred direction of magnetization substantially helical about said conductor, a first solenoid encompassing at least a portion of the magnetic material wrapped around the length of said conductor, means including said first solenoid for magnetizing the said portion of magnetic material to a first state along said preferred direction to represent a first value of information, and in a second state to represent a second value of information, a second solenoid encompassing only the median part of the said portion of magnetic material encompassed by said first solenoid, circuit means including said second solenoid for magnetizing to said first state said median part only of the said portion of magnetic material, the change in magnetization of said median part from one state to its other state inducing a voltage signal in said electrical conductor, circuit means including said second solenoid for applying to said median part only of said portion of magnetic material a magnetic field of sufficient intensity to magnetize said median part to said second state, if, and only if, the non-median parts of the said portion of magnetic material are magnetized to said second state.

12. A magnetic data store as defined in claim 11 further characterized in that said second solenoid has a length not greater than one-fourth the length of said first solenoid.

References Cited by the Examiner

UNITED STATES PATENTS

| | | | |
|---|---|---|---|
| 2,430,457 | 11/1947 | Dimond | 307—88 |
| 2,722,603 | 11/1955 | Dimond | 340—174 |
| 2,781,503 | 2/1957 | Saunders | 340—174 |
| 2,920,317 | 1/1960 | Mallery | 340—172 |
| 2,945,217 | 7/1960 | Fisher et al. | 340—174 |
| 2,984,825 | 5/1961 | Fuller et al. | 340—174 |

FOREIGN PATENTS

| | | |
|---|---|---|
| 1,150,870 | 7/1955 | France. |

OTHER REFERENCES

Pages 822 to 830, January 1954, "Communications and Electronics."

Pages 95 to 98, January 1958, "Electrical Manufacturing," vol. 61, No. 1.

Pages 1319 to 1340, November 1957, "The Bell System Technical Journal," vol. 36, No. 6.

BERNARD KONICK, *Primary Examiner.*

WALTER W. BURNS, Jr., IRVING L. SRAGOW, *Examiners.*

R. R. HUBBARD, J. W. MOFFITT, *Assistant Examiners.*